US008694697B1

(12) United States Patent
Nuechterlein

(10) Patent No.: US 8,694,697 B1
(45) Date of Patent: Apr. 8, 2014

(54) RESCINDABLE INSTRUCTION DISPATCHER

(75) Inventor: David William Nuechterlein, Longmont, CO (US)

(73) Assignee: NVIDIA Corporation, Santa Clara, CA (US)

( * ) Notice: Subject to any disclaimer, the term of this patent is extended or adjusted under 35 U.S.C. 154(b) by 1441 days.

(21) Appl. No.: 11/412,453

(22) Filed: Apr. 27, 2006

(51) Int. Cl.
*G06F 13/14* (2006.01)

(52) U.S. Cl.
USPC ............................................. 710/33; 710/20

(58) Field of Classification Search
USPC ........... 345/24, 419, 420, 421, 422, 503, 505, 345/522, 530, 531, 537, 541, 533, 558, 559, 345/582, 589, 620, 629, 502; 370/225, 230, 370/252, 392, 428, 503, 505, 522; 710/22, 710/310, 52; 711/100, 110, 118, 125, 154, 711/170; 712/205, 206, 207, 209, 212, 214, 712/215, 216, 217, 218, 219, 225, 228, 229, 712/23, 239, 244; 713/375
See application file for complete search history.

(56) References Cited

U.S. PATENT DOCUMENTS

| | | | | |
|---|---|---|---|---|
| 5,990,913 A * | 11/1999 | Harriman et al. | ............. | 345/531 |
| 6,055,616 A * | 4/2000 | Panwar | ......................... | 711/170 |
| 6,184,908 B1 * | 2/2001 | Chan et al. | .................... | 345/522 |
| 6,252,600 B1 * | 6/2001 | Kohli et al. | .................... | 345/419 |
| 6,339,427 B1 * | 1/2002 | Laksono et al. | ............... | 345/553 |
| 6,804,266 B1 * | 10/2004 | Kovacevic et al. | ............ | 370/505 |
| 6,835,874 B2 * | 12/2004 | Eby | ............................... | 800/312 |
| 6,877,085 B2 * | 4/2005 | Yeh et al. | ...................... | 712/216 |
| 6,912,648 B2 * | 6/2005 | Hammarlund et al. | ....... | 712/219 |
| 6,988,186 B2 * | 1/2006 | Eickemeyer et al. | ......... | 712/217 |
| 6,988,238 B1 * | 1/2006 | Kovacevic et al. | ............ | 714/799 |
| 6,995,773 B2 * | 2/2006 | Doyle et al. | ................... | 345/559 |
| 7,133,546 B2 * | 11/2006 | Dehmeshki et al. | .......... | 382/128 |
| 7,162,613 B2 * | 1/2007 | Yeh et al. | ...................... | 712/216 |
| 7,196,710 B1 * | 3/2007 | Fouladi et al. | ................ | 345/553 |
| 7,523,152 B2 * | 4/2009 | Roussel et al. | ................ | 708/650 |
| 2007/0028078 A1 * | 2/2007 | Harris et al. | .................. | 712/214 |
| 2007/0083742 A1 * | 4/2007 | Abernathy et al. | ........... | 712/244 |
| 2007/0118726 A1 * | 5/2007 | Abernathy et al. | ........... | 712/225 |

OTHER PUBLICATIONS

Virginia Tech CS2605 Legacy Course Note, 2001, Virginia Tech Computer Science Department, pp. 1-15. http://courses.cs.vt.edu/~cs2605/spring08/LegacyNotes/1704/C11.Queues.pdf.*
Johnson, Superscalar Microprocessor Design, 1991, Prentice Hall, p. 21.*
Main, Data Structures and Other Objects Using Java, 1999, Addison Wesley, pp. 325-329, 347-361.*

* cited by examiner

*Primary Examiner* — Cheng-Yuan Tseng
(74) *Attorney, Agent, or Firm* — Patterson & Sheridan, LLP

(57) ABSTRACT

A system and method dispatches commands from multiple instruction streams to processing engines, allowing for some of the dispatched commands to be rescinded before they are executed by the processing engines. The dispatching enables several of the processing engines to execute commands concurrently. Dispatched commands may be rescinded to quickly switch processing from one instruction stream to another instruction stream.

12 Claims, 9 Drawing Sheets

RESCINDABLE INSTRUCTION DISPATCHER

BACKGROUND OF THE INVENTION

1. Field of the Invention

Embodiments of the present invention generally relate to dispatching commands for execution by a processing engine, and more particularly to rescinding a portion of the dispatched commands before they are executed.

2. Description of the Related Art

Conventional instruction stream scheduling allocates a specific amount of time; a time slice, to each instruction stream in a multiple processing engine system during which commands from a first instruction steam are dispatched for execution. When the time slice for the first instruction stream expires, the instruction stream dispatcher switches contexts, thereby selecting another instruction stream and outputs the other instruction stream for execution. When a portion of the dispatched commands from the first instruction stream remain in a shared command queue that outputs the commands to each of the processing engines, commands from a second instruction stream cannot be executed until the dispatched commands for the first instruction stream are output to a processing engine for execution.

Commands in the shared queue have been dispatched for execution and are "in-flight" for output to one of the processing engines. When the in-flight commands from a particular instruction stream cannot be output from the queue, subsequent commands are blocked and cannot be output from the queue or dispatched. Therefore, some processing engines may be idle while other processing engines are overwhelmed, limiting processing concurrency and instruction stream throughput.

Accordingly, there is a need to minimize the number of in-flight commands to achieve greater processing concurrency and improve overall instruction stream throughput.

SUMMARY OF THE INVENTION

The current invention involves new systems and methods for dispatching commands from multiple instruction streams to processing engines, allowing for some of the dispatched commands that are in-flight to a particular processing engine to be rescinded before they are executed. The ability to switch between different instruction streams during command dispatching enables several of the multiple processing engines to execute commands concurrently. Dispatched commands that are in-flight may be rescinded to remove the in-flight commands from a shared command queue and quickly switch from dispatching one instruction stream to dispatching another instruction stream. Rescinding in-flight commands allows the multiple processing engines to achieve greater processing concurrency and improve overall instruction stream throughput.

Various embodiments of the invention include a system for dispatching commands for execution by a target processing engine include an engine interface, a command first-in first-out (FIFO) memory, and a dispatcher. The command FIFO memory is configured to receive the commands and store the commands until the commands are committed commands, maintaining a first output pointer to a next command for output by the command FIFO memory, and maintaining a second output pointer to a first in-flight command. The engine interface is configured to receive the commands from the command FIFO memory and store the commands as in-flight commands, including the first in-flight command, for output to the target processing engine as the committed commands. The dispatcher is configured to rescind the in-flight commands and update the first output pointer to point to the first in-flight command of the in-flight commands stored in the command FIFO memory, in order to provide the in-flight commands to the engine interface at a later time.

Various embodiments of a method of the invention for dispatching commands for execution by a target processing engine include receiving a command for dispatch including a target processing engine type from a command first-in first-out (FIFO) memory, storing the command in a storage resource that is coupled between the command FIFO memory and the target processing engine as an in-flight command for output to the target processing engine, determining that the in-flight command should be rescinded, and rescinding the in-flight command by updating an output pointer that points to an entry in the command FIFO memory that stores a next command for dispatch that has not been output from the command FIFO memory to point to an entry in the command FIFO memory that stores a first in-flight command for output to the target processing engine.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

A system and method dispatches commands to multiple processing engines, allowing for some of the dispatched commands, i.e., in-flight commands, to be rescinded before they are executed by the multiple processing engines. The dispatching enables several of the multiple processing engines to execute commands concurrently. In-flight commands may be rescinded to remove them from a shared command queue and quickly switch processing from one instruction stream to another instruction stream. In a conventional system, in-flight commands for a first processing engine may remain in the shared command queue and prevent in-flight commands for a second, potentially idle, processing engine from being executed, thereby reducing command execution throughput.

Figure 1:
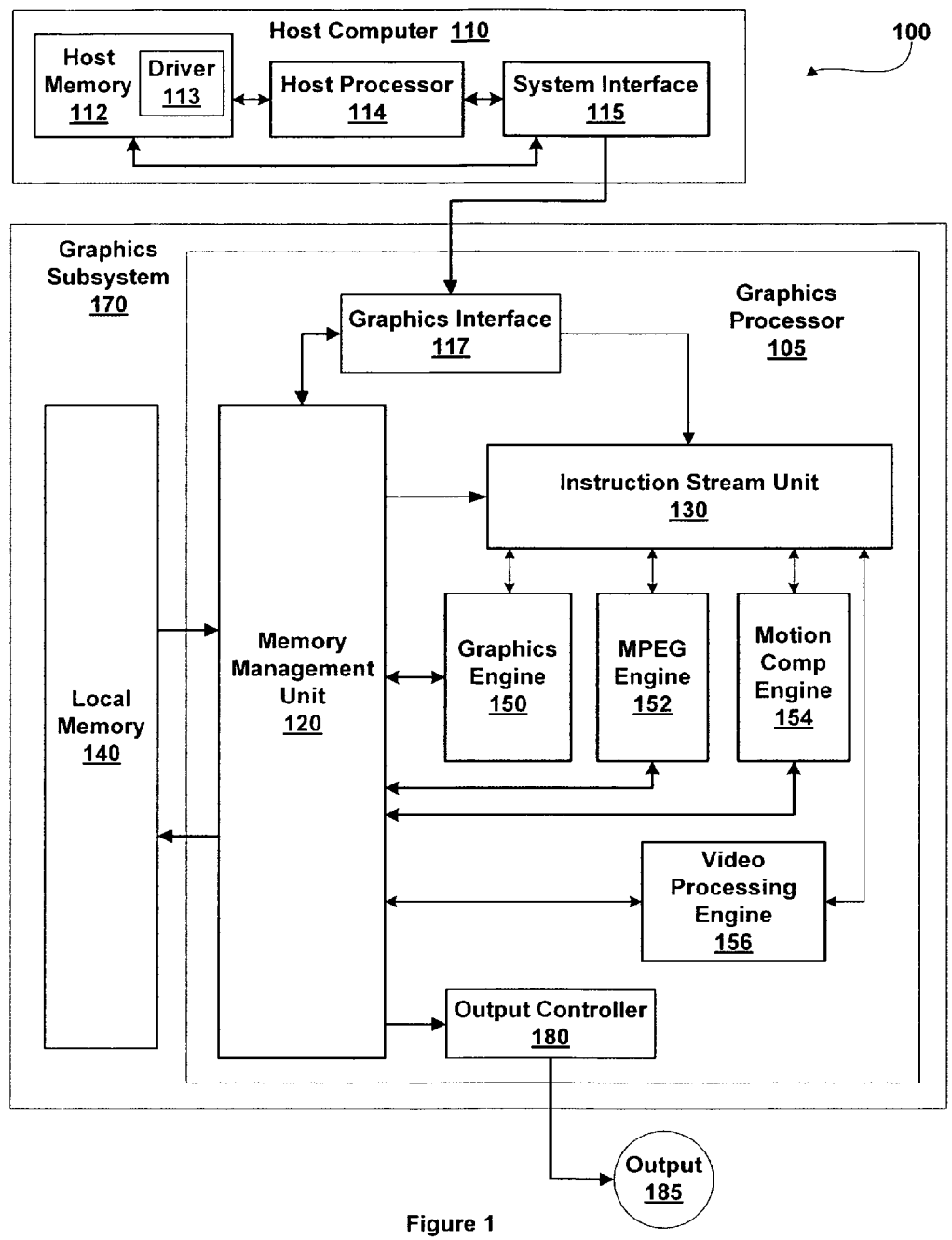
FIG. 1 illustrates a block diagram of a graphics processing system in accordance with one or more aspects of the present invention.

FIG. 1 is an illustration of a computing system generally designated 100 and including a host computer 110 and a graphics subsystem 170. Computing system 100 may be a desktop computer, server, laptop computer, palm-sized computer, tablet computer, game console, portable wireless terminal such as a personal digital assistant (PDA) or cellular telephone, computer based simulator, or the like. Host computer 110 includes a host processor 114 that may include a system memory controller to interface directly to a host memory 112 or may communicate with host memory 112 through a system interface 115. System interface 115 may be an I/O (input/output) interface or a bridge device including the system memory controller to interface directly to host memory 112. An example of system interface 115 known in the art includes Intel® Northbridge.

A graphics device driver, driver 113, is a software program that interfaces between processes executed by host processor 114, such as application programs, and graphics processor 105, translating program instructions as needed for execution by graphics processor 105. Host computer 110 communicates with graphics subsystem 170 via system interface 115 and a graphics interface 117 within a graphics processor 105. Data and program instructions received at graphics interface 117 can be passed to an instruction stream unit 130 or written to a local memory 140 through memory management unit 120.

Instruction stream unit 130 reads instruction streams from local memory 140 via memory management unit 120, parses and expands the instruction streams, and outputs expanded commands to a variety of processing engines, including a graphics engine 150, an MPEG (motion picture experts group) engine 152, a motion comp (compensation) engine 154, and a video processing engine 156. Each processing engine also interfaces with memory management unit 120 to read data from and to write data to memory that is accessible via memory management unit 120. In some embodiments of the present invention additional processing engines are coupled to instruction stream unit 130 and memory management unit 120. The additional processing engines may include any of the processing engines shown in FIG. 1 or other processing engines, such as audio processing engines or other special purpose processing engines.

Graphics engine 150, MPEG engine 152, motion comp engine 154, and video processing engine 156 each contain one or more programmable processing units to perform a variety of specialized functions. Some of these functions are table lookup, scalar and vector addition, multiplication, division, coordinate-system mapping, calculation of vector normals, tessellation, calculation of derivatives, interpolation, filtering, scaling, format conversion, and the like. In a typical implementation graphics engine 150 performs geometry computations, rasterization, and fragment computations, operating on surface, primitive, vertex, fragment, pixel, sample or any other data. In typical implementation MPEG engine 152 performs MPEG decoding of frames of image data. Likewise, motion comp engine 154 performs motion compensation operations known to those skilled in the art. Video processing engine 156 processes image data for display, performing operations such as compositing, format conversion, scaling, filtering, and the like. The engines are typically pipelined and can therefore perform several operations in parallel, processing multiple consecutive instructions from a single instruction stream at any time, producing the same result as if the multiple consecutive instructions had been executed serially.

When the data, program instructions, and commands received by graphics subsystem 170 have been completely processed by graphics processor 105, an output 185 of graphics subsystem 170 is provided using an output controller 180. Output controller 180 is optionally configured to deliver processed data to a display device, network, electronic control system, other computing system such as computing system 100, other graphics subsystem 170, or the like. Alternatively, the processed data is output to a film recording device or written to a peripheral device, e.g., disk drive, tape, compact disk, or the like.

Figure 2A:
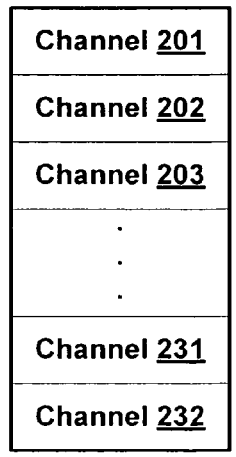
FIG. 2A illustrates a conceptual diagram of several channels in accordance with one or more aspects of the present invention.

FIG. 2A illustrates a conceptual diagram of several channels, channels 201, 202, 203, 231, and 232, in accordance with one or more aspects of the present invention. Each channel includes at least a portion of an instruction stream that configures a processing engine to perform specific operations. The program instructions are parsed by instruction stream unit 130 to produce commands, as described in conjunction with FIG. 2B. In addition to the commands, each processing engine may read data via memory management unit 120 and the data is processed according to the commands to produce processed data. A single application program may communicate with driver 113 to produce one or more channels. Each channel may be stored in local memory 140, host memory 112, or in a memory resource, e.g., cache, or the like, within graphics processor 105.

Some channels, such as channel 201 and 202, include program instructions for a single processing engine, such as graphics engine 150, MPEG engine 152, motion comp engine 154, video processing engine 156, or the like. Other channels, such as channel 203, include program instructions for two or more processing engines. Several channels may be processed concurrently, each by a different processing engine or serially by a single pipelined processing engine. The program instructions within each channel are processed in order to maintain data coherency and only one processing engine may process a particular instruction stream at a time. For example, a first group of program instructions within a channel may generate processed data which is further processed by a second group of program instructions within the same channel.

When a channel includes program instructions for multiple processing engines, i.e., a multi-processing engine channel, the first group of program instructions and the second group of program instructions may be processed by different processing engines, and the processed data may be written to memory by one of the multiple processing engines and read from memory by another one of the multiple processing engines. Execution of the multi-processing engine channel program instructions is not performed concurrently by two or more processing engines in order to maintain processed data coherency.

Figure 2B:
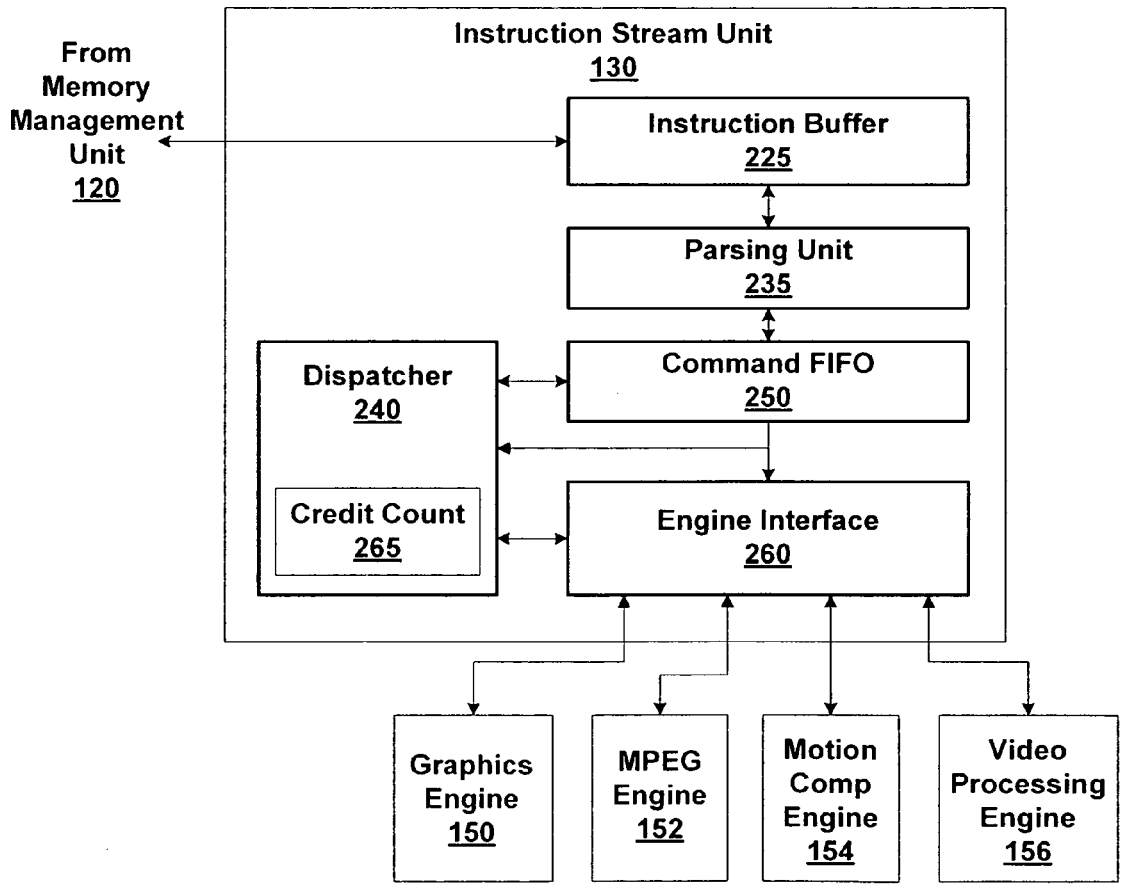
FIG. 2B illustrates a block diagram of a portion of the graphics processor shown in FIG. 1 in accordance with one or more aspects of the present invention.

FIG. 2B illustrates a block diagram of a portion of graphics processor 105 shown in FIG. 1, in accordance with one or more aspects of the present invention. A instruction buffer 225 within instruction stream unit 130 selects a channel for processing. Specifically, instruction buffer 225 outputs a read request to memory management unit 120 specifying which group of program instructions to read from the selected channel. In some embodiments of the present invention, a runlist is provided which specifies an order for selecting the channel for processing. The runlist may be generated by driver 113 and stored within instruction stream unit 130 or stored in local memory 140 and read by instruction stream unit 130. In other embodiments of the present invention, instruction buffer 225 processes the channels in the order they are stored in memory, returning to the first channel once the last channel has been processed using a round-robin selection scheme. In other embodiments of the present invention, a priority may be specified for each channel and instruction buffer 225 selects channels for processing based on the specified priorities.

When graphics processor 105 is implemented as an integrated circuit, sharing instruction buffer 225 and parsing unit 235 between multiple processing engines may use less die area compared with using a separate instruction stream unit, such as instruction stream unit 130, for each processing engine. Furthermore, multi-processing engine channel data dependencies, i.e., coherence, may be maintained when a single instruction stream unit, such as instruction stream unit 130, controls the output of commands to each processing engine targeted by the multi-processing engine channel. Techniques known to those skilled in the art, such as semaphores, may be used as needed to control timing of the output of commands from different channels to one or more processing engines. In some embodiments of the present invention, two or more instruction stream units 130 may be used, as desired, to output expanded commands to one or more processing engines.

Program instructions included in the channel read by instruction buffer 225 are returned from memory management unit 120 to a parsing unit 235. Parsing unit 235 parses the group of program instructions and determines which processing engine each program instruction targets, i.e. determines a processing engine type associated with the program instruction. Parsing unit 235 processes the program instruction and produces one or more commands, as described in conjunction with FIG. 3.

Parsing unit 235 outputs each command to a command FIFO (first-in first-out) memory 250 which is used to queue commands for dispatch to the processing engines via an engine interface 260. A dispatcher 240 examines the command at the output of command FIFO 250 and processes the command if the command is a "local command," i.e., the target processing engine is command stream unit 130, as described in conjunction with FIG. 4B. Otherwise, dispatcher 240 dispatches the command for execution by a target processing engine by reading the command from command FIFO 250 and pushing the command into engine interface 260. Once a command is pushed into engine interface 260 it is "in-flight" for execution by a processing engine. When the command is output by engine interface 260 to the target processing engine it is committed for execution and is no longer in-flight. When an in-flight command is committed it may be removed (popped) from command FIFO 250. Note that the commands are read, but not popped, from command FIFO 250 when the commands are input to engine interface 260 and become in-flight commands.

Dispatcher 240 includes a credit count 265 that tracks the number of in-flight commands. As shown in greater detail in FIG. 2D, the Command FIFO 250 maintains two output pointers and one input pointer. The input pointer is a conventional FIFO input pointer, and points to the next (first) entry available to store a new command. The first output pointer is a conventional FIFO output pointer, and points to the next (first) entry for dispatch, i.e., the first command that has not already been output to engine interface 260. The second output pointer, the committed pointer, points the next (first) in-flight command for output from engine interface 260 to a processing engine.

Credit count 265 is updated when in-flight commands are input to and output from engine interface 260 to compute the number of in-flight commands. Dispatcher 240 provides a read signal and a commit signal to command FIFO 250 to update the first output pointer and the committed pointer, respectively. Dispatcher 240 also provides a rescind signal to command FIFO 250 that forces the first output pointer to point to the first in-flight command for output by engine interface 260 to a processing engine. In other words, the rescind signal causes the first output pointer to point to the same entry as the commit pointer. The rescind signal is also output by dispatcher 240 to engine interface 260 to rescind, i.e., discard, all of the in-flight commands stored in engine interface, as described in conjunction with FIG. 4A. Discarding the in-flight commands permits dispatching of commands for a different channel to begin more quickly than waiting until the in-flight commands for the current channel to be dispatched.

Figure 2C:
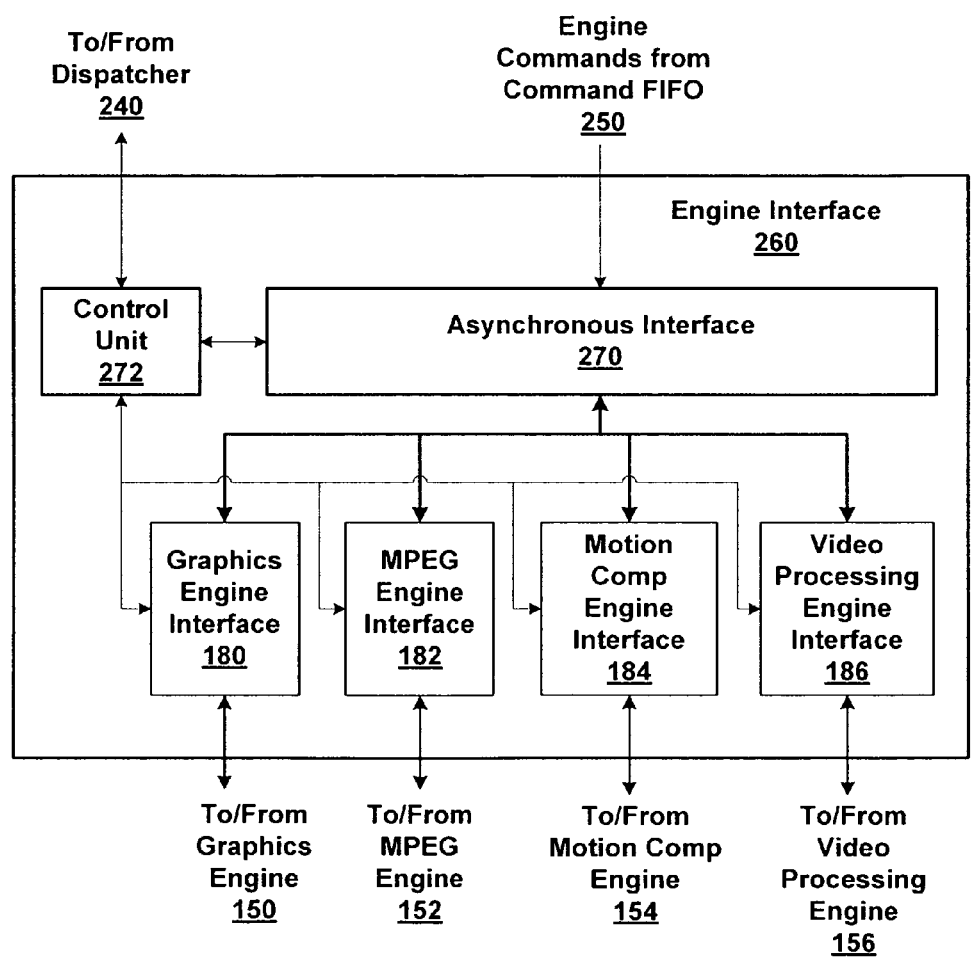
FIG. 2C illustrates a block diagram of the engine interface shown in FIG. 2B in accordance with one or more aspects of the present invention.
Figure 2D:
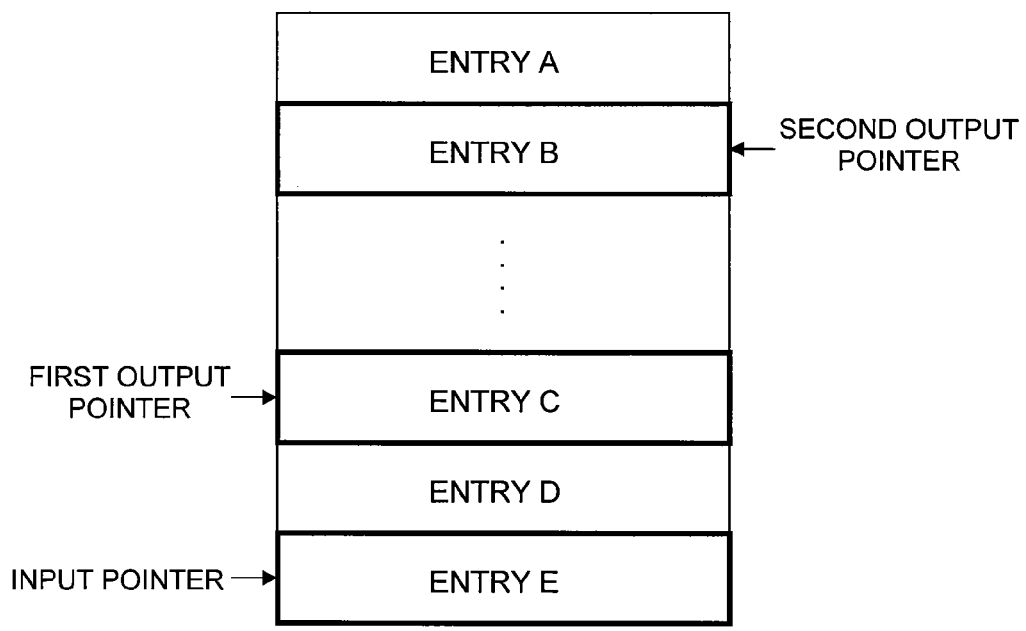
FIG. 2D illustrates the interaction of the pointers relative to the command FIFO in accordance with one or more aspects of the invention.

FIG. 2C illustrates a block diagram of engine interface 260 shown in FIG. 2B, in accordance with one or more aspects of the present invention. As previously described, engine interface 260 receives commands from command FIFO 250. A control unit 272 within engine interface 260 receives push and rescind signals from dispatcher 240. When a push signal is received a command received from command FIFO 250 is pushed in an asynchronous interface 270. Pushed commands are stored within engine interface 260 as in-flight commands, until they are output (popped) from asynchronous interface 270 and received by one of the processing engines. When in-flight commands are popped from engine interface 260 a commit signal is output by engine interface 260 to dispatcher 240.

Asynchronous interface 270 provides for reliable transmission of the commands between different clock domains. For example, command FIFO 250 may operate in a first clock domain and one or more of the processing engines may operate in a different clock domain. A number of storage resources, e.g., registers, latches, flip-flops, or the like, within asynchronous interface 270 store the in-flight commands. In some embodiments of the present invention, asynchronous interface 270 is omitted and command FIFO 250 outputs commands to the processing engines through an engine processing interface, e.g., graphics engine interface 280, MPEG engine interface 182, motion comp engine interface 184, and video processing engine interface 186.

Asynchronous interface 270 outputs each in-flight command to one of the engine processing interfaces based on the target processing engine type specified by the in-flight command. The target processing engine type may be stripped from the in-flight command before it is stored in one of the engine processing interfaces. Like asynchronous interface 270, each engine processing interface includes a number of storage resources to store in-flight commands for a target processing engine. In-flight commands output from an engine processing interface 260 are committed commands that are output for execution by a target processing engine and are no longer considered in-flight commands.

When a rescind command generated by dispatcher 240 is received by control unit 272, control unit 272 signals asynchronous interface 270 to discard all of the in-flight commands stored within asynchronous interface 270. Control unit 272 also signals the engine processing interfaces to discard all of the in-flight commands stored for output to the processing engines. When an engine processing interface outputs an in-flight command to the corresponding target processing engine, a commit (pop) signal is output to control unit 272. In some embodiments of the present invention, engine interface 260 only processes commands for one target processing engine type at a time and therefore, the commit signals from each processing engine interface may be bitwise ORed together to produce a single combined commit signal to control unit 272. When more than one in-flight command may be committed in a clock cycle, the commit signal may include two or more bits. An exemplary interface protocol used by each processing engine interface is described in conjunction with FIG. 5.

Figure 3:
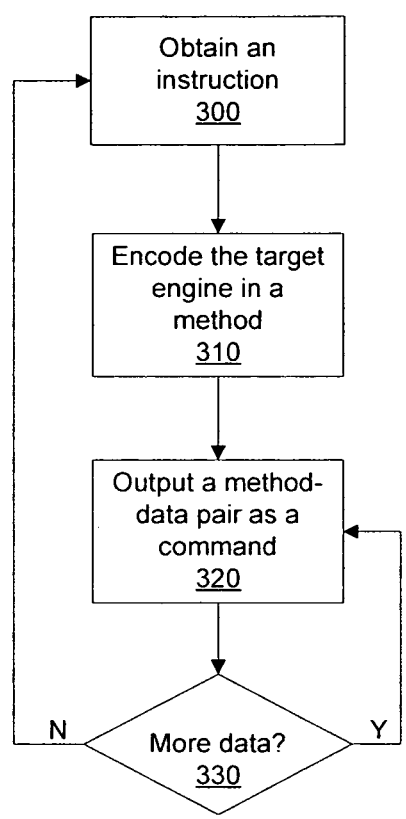
FIG. 3 illustrates an exemplary embodiment of a method for parsing instructions to produce commands for a target processing engine in accordance with one or more aspects of the present invention.

FIG. 3 illustrates an exemplary embodiment of a method for parsing instructions to produce commands for a target processing engine, in accordance with one or more aspects of the present invention. In step 300 parsing unit 235 obtains a program instruction from instruction buffer 225. In some embodiments of the present invention, the program instructions are encoded in a compressed format that includes one command followed by a stream of data. The compression is a variation of a conventional run-length encoding scheme and includes a length defining the number of elements in the stream of data. Each element in the stream of data should be processed using the command. Parsing unit 235 expands the program instructions to produce a stream of commands, where each command includes one element from the stream of data.

In step 310 parsing unit 235 encodes the target processing engine corresponding to the program instruction in a method. A method is a combination of the command and target engine. In step 320 parsing unit 235 outputs a method-data pair, including one element from the stream of data, as a command. In step 330 parsing unit 235 determines if there are any more elements in the stream of data (based on the specified length), and, if so, parsing unit 235 returns to step 320 and outputs another command. Otherwise, parsing unit 235 returns to step 300 and obtains another program instruction. In some embodiments of the present invention, the program instruction received in step 300 indicates that a command output in step 320 should be modified. In some embodiments of the present invention, the next program instruction may be selected based on a timeslice allocated to each channel and parsing unit 235 obtains a program instruction from a different channel when parsing unit 235 returns to step 300. Parsing unit 235 may be configured to switch to a different channel immediately when the timeslice allocated to the current channel expires. In that case, parsing unit 235 saves sufficient information to resume decoding the program instruction when the current channel is allocated another timeslice.

Figure 4A:
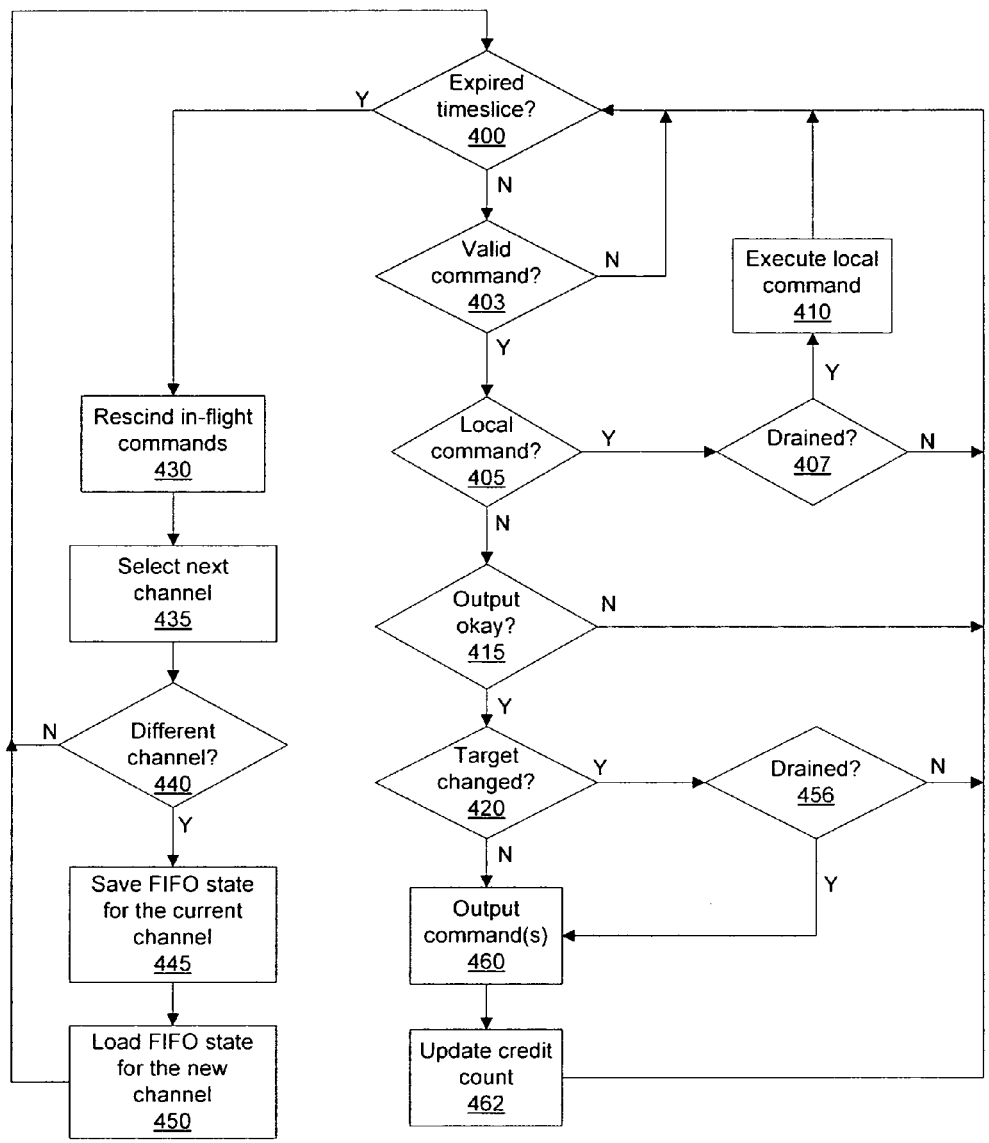
FIG. 4A illustrates an exemplary embodiment of a method for dispatching commands for output to a target processing engine in accordance with one or more aspects of the present invention.

FIG. 4A illustrates an exemplary embodiment of a method for dispatching commands for output to a target processing engine in accordance with one or more aspects of the present invention. In step 400 dispatcher 240 determines if the timeslice allocated to the channel has expired, and, if not, dispatcher 240 proceeds to step 403. Otherwise, in step 430 dispatcher 240 rescinds the in-flight commands stored in engine interface 260. Specifically, dispatcher 240 signals command FIFO 250 to update the output pointer to point to the first in-flight command stored in command FIFO 250. A more detailed description of step 430 is provided in conjunction with FIG. 4C. Rescinding the in-flight commands may improve command processing throughput compared with allowing the in-flight commands to remain in engine interface 260 until they are committed, i.e., output to the target processing engine. This is because it may take many clock cycles to complete processing of the in-flight commands, during which time other processing engines may remain or become idle while the target processing engine may be overwhelmed.

In-flight commands are retained in command FIFO 250 until they are output by engine interface 260 to a target processing engine. Specifically, the commands stored in entries between and including the output pointer and the commit pointer are the in-flight commands. Retaining the in-flight commands allows for them to be rescinded and then output again at a later time simply by adjusting the output pointer to point to the same entry as the commit pointer, i.e., the first in-flight command. Therefore, dispatcher 240 also signals engine interface 260 to discard the in-flight commands since they will be redispatched by command FIFO 250 at a later time and the credit count is reset to indicate that the number of in-flight commands is zero. Additionally, the input pointer should not equal or pass the committed pointer, since that would cause in-flight commands to be overwritten with new commands.

In step 435 parsing unit 235 selects the next channel for processing. In step 440 parsing unit 235 determines if the next channel is different than the current channel, and, if not, dispatcher 240 proceeds to step 400 and continues to process the commands during the channel timeslice as commands are available at the output of command FIFO 250. If, in step 440 parsing unit 235 determines that the next channel is different than the current channel, then a channel context switch is needed and the current state of command FIFO 250 should be saved in order to restart processing of the current channel where it was stopped. In step 445 dispatcher 240 saves the state of command FIFO 250 to capture the processing state of the current channel: In particular, commands stored in command FIFO 250, the input pointer (write pointer), the output pointer, and the committed pointer, are saved in a memory resource, e.g., registers, random access memory (RAM), latches, or the like. The memory resource may be local memory 140, host memory 112, or memory storage within graphics processor 105.

In step 450 dispatcher 240 loads the state of the next channel in order to begin processing the next channel where the previous processing of the next channel left off. Specifically, dispatcher 240 loads command FIFO 250 with the commands stored in command FIFO 250, the input pointer, the output pointer, and the committed pointer stored in the memory resource. Once the state for the next channel is loaded into command FIFO 250, the channel context switch is complete and dispatcher 240 returns to step 400 to begin processing commands for the (next, now current) channel.

If, in step 400 dispatcher 240 determines that the timeslice allocated to the channel has not expired, then in step 403 dispatcher 240 determines if a valid command is available at the output of command FIFO 250, and, if not, dispatcher 240 returns to step 400. Otherwise, in step 405 dispatcher 240 determines if the command is a local command for execution by target processing engine, command stream unit 130. If, in step 405, dispatcher 240 determines that the command is a local command, then in step 407 dispatcher 240 determines if the in-flight commands are drained, i.e., there are no in-flight commands stored in engine interface 260 and command FIFO 250. If, in step 407 dispatcher 240 determines that the in-flight commands are drained, then in step 410 dispatcher 240 dispatches (reads) the command from command FIFO 250 and executes the local command, as described in conjunction with FIG. 4B. Otherwise, dispatcher 240 returns to step 400 and repeats steps 400, 403, 405 and 407 until either the in-flight commands are drained or the timeslice allocated to the channel has expired.

If, in step 405, dispatcher 240 determines that the command is not a local command, then in step 415 dispatcher 240 determines if engine interface 260 can receive a pushed command, i.e., if engine interface 260 is not full, and, if so, dispatcher 240 proceeds to step 420. Otherwise, dispatcher 240 returns to step 400 and repeats steps 400, 403, 405, and 415 until either engine interface 260 can receive a pushed command or the timeslice allocated to the channel has expired.

In step 420 dispatcher 240 determines if the target engine has changed compared with the last command that was dispatched from command FIFO 250 and input to engine interface 260. In some embodiments of the present invention, the in-flight commands stored in engine interface 260 should all have the same target processing engine type. In those embodiments of the present invention, the commands stored in command FIFO 250 and in-flight commands are drained before commands for a different target processing engine are stored in engine interface 260. Consequently, if, in step 420 dispatcher 240 determines that the target processing engine has changed compared with the last command that was output by command FIFO 250 and pushed into engine interface 260, then in step 407 dispatcher 240 determines if the in-flight commands are drained, i.e., there are no in-flight commands stored in engine interface 260 and command FIFO 250. If, in step 407 dispatcher 240 determines that the in-flight commands are drained, then dispatcher 240 proceeds to step 460 to output a command to engine interface 260. Otherwise, dispatcher returns to step 400 and repeats steps 400, 403, 405 and 407 until either the in-flight commands are drained or the timeslice allocated to the channel has expired. When all of the in-flight commands stored in engine interface 260 have been drained, i.e., output to the target processing engine, dispatcher 240 may proceed to step 460 and output the command(s) for the new target processing engine.

In some embodiments of the present invention, two or more commands are output by command FIFO 250 and pushed into engine interface 260 and in step 460 dispatcher 240 outputs command(s) from command FIFO 250 and pushes the command(s) into engine interface 260. Dispatcher 240 asserts the read signal to command FIFO 250 and command FIFO 250 updates the output pointer accordingly. Because the commit pointer is not updated in response to the read signal the in-flight command(s) remain in command FIFO 250. In step 462 dispatcher 240 updates credit count 265 by decrementing credit count 265 by the number of commands pushed into engine interface 260.

Credit count 265 is initialized to the maximum number of in-flight commands that may be stored in engine interface 260. The difference between that maximum and credit count 265 represents the current number of in-flight commands stored in engine interface 260. In other embodiments of the present invention, credit count 265 is incremented for each command that dispatcher 240 pushes into engine interface 260 and credit count 265 is decremented for each command that is output by engine interface 260 to a target processing engine. In the other embodiments of the present invention, credit count 265 may be initialized to a value of zero.

Figure 4B:
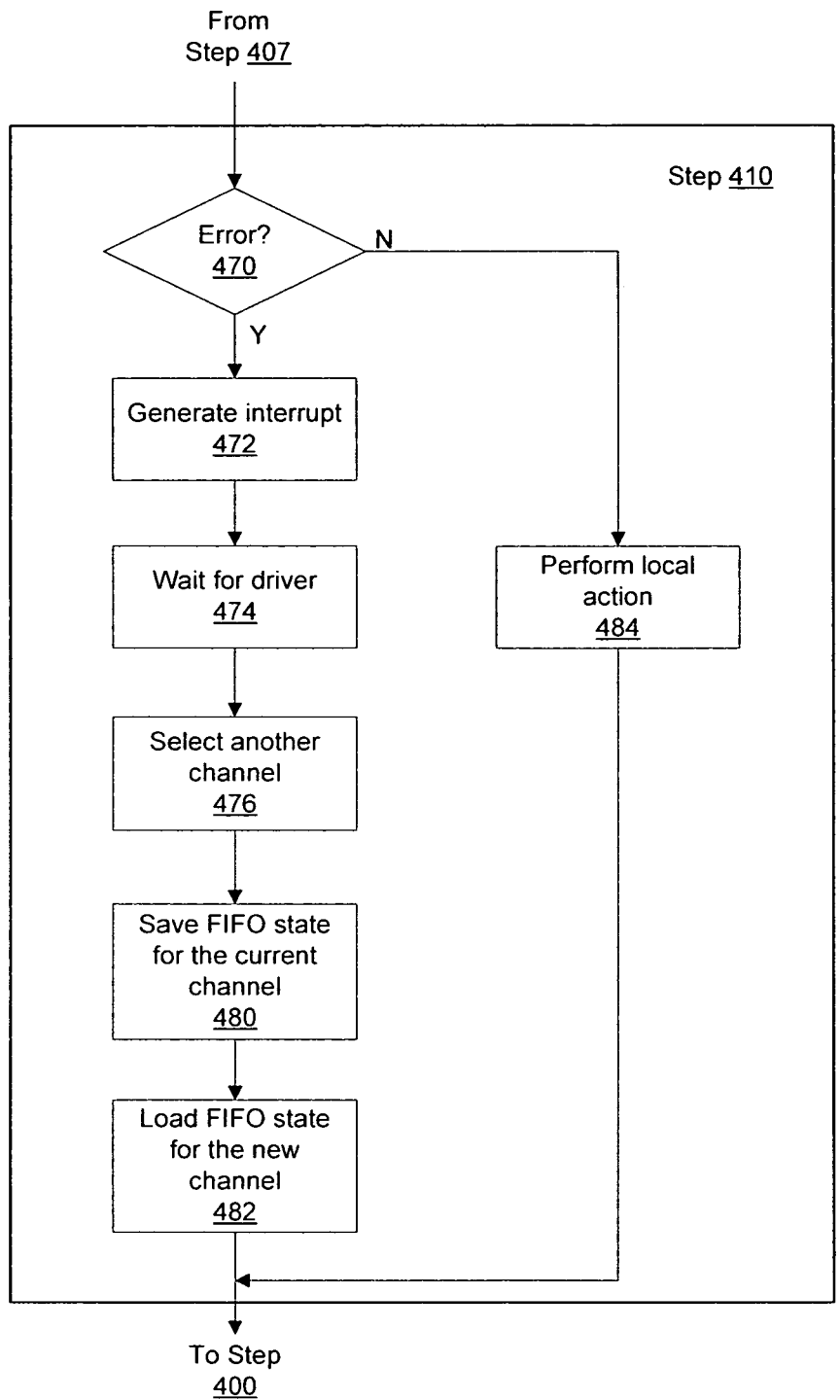
FIG. 4B illustrates an exemplary embodiment of a method for completing step 410 of FIG. 4A in accordance with one or more aspects of the present invention.

FIG. 4B illustrates an exemplary embodiment of a method for executing a local command, i.e., completing step 410 of FIG. 4A, in accordance with one or more aspects of the present invention. In step 470 dispatcher 240 determines if an error has occurred, and, if not, in step 484 dispatcher 240 performs a local action, such as an inter-channel synchronization operation. Dispatcher 240 may determine that an error has occurred by reading a particular memory location that was written by a processing engine. In other embodiments of the present invention, dispatcher 240 may receive a signal from a processing engine indicating that an error has occurred. To perform the local action in step 484, dispatcher 240 may not read commands from command FIFO 250 and instead wait for the in-flight commands to be committed. In step 484, once the in-flight commands have all been committed so that engine interface 260 is empty, dispatcher 240 may notify driver 113 that the synchronization process is complete. The notification may be completed by writing a location in memory with a predetermined value that may be read by driver 113. Additionally, in step 484 dispatcher 240 may update some local state information related to the processing of the current channel.

If, in step 470 dispatcher 240 determines that an error has occurred, then in step 472 dispatcher 240 generates an interrupt to initiate processing of the error by the operating system. When an error condition occurs during the processing of a channel, dispatcher 240 switches processing to another channel. In step 474 dispatcher 240 waits for driver 113 to respond to the interrupt. While waiting for driver 113 in step 474 dispatcher 240 does not continue to process commands for the channel. In step 476 another channel is selected for processing by parsing unit 235. In step 480 dispatcher 240 saves the state of command FIFO 250 in order to continue processing the current channel at a later time, i.e., after the error is resolved. In step 482 dispatcher 240 loads the state of command FIFO 250 with the state information for the new channel that was selected in step 476 and proceeds to step 400 to process program instructions for the new channel.

Figure 4C:
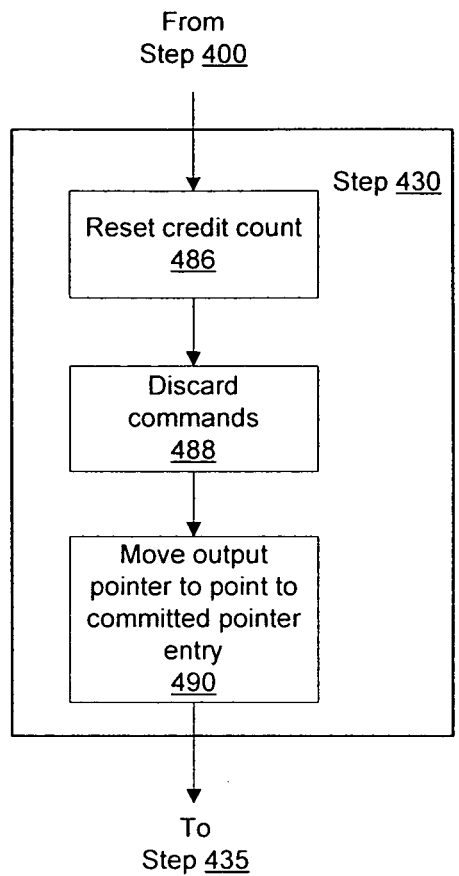
FIG. 4C illustrates an exemplary embodiment of a method for updating the state information for rescinded commands in accordance with one or more aspects of the present invention.

FIG. 4C illustrates an exemplary embodiment of a method for updating the state information for rescinded commands, i.e., performing step 430 of FIG. 4A, in accordance with one or more aspects of the present invention. In step 486 dispatcher 240 resets credit count 265 to indicate that engine interface 260 stores no in-flight commands and in step 488 dispatcher 240 signals engine interface 260 to discard the in-flight commands. In step 490 dispatcher 240 signals command FIFO 250 to rescind the in-flight commands by updating the output pointer to point to the first in-flight command stored in command FIFO 250, i.e., the entry pointed to by the committed pointer. This will cause command FIFO 250 to output the rescinded in-flight commands again when processing of the current channel resumes.

Figure 4D:
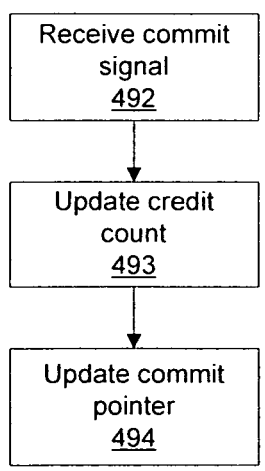
FIG. 4D illustrates an exemplary embodiment of a method for updating the state information for committed commands in accordance with one or more aspects of the present invention.

FIG. 4D illustrates an exemplary embodiment of a method for updating the state information for committed commands, in accordance with one or more aspects of the present invention. In step 492 dispatcher 240 receives a commit signal from engine interface 260 and in step 493 dispatcher 240 updates credit count 265. Specifically, dispatcher 240 increments credit count 265 by the number of commands that were committed, according to the commit signal. In particular, the commit signal may indicate two commands were committed for graphics engine 150 or the commit signal may indicate that one command was committed for another target processing engine. In step 494 dispatcher 240 outputs the commit signal to command FIFO 250 and command FIFO 250 updates the commit pointer, effectively removing the one or two in-flight commands from command FIFO 250.

In some embodiments of the present invention, the processing engines may include input buffers to store one or more in-flight commands. In those embodiments, a commit signal is output by each of the processing engines to engine interface 260 and engine interface 260 may perform a bitwise OR of the commit signals to produce the commit signal for output to dispatcher 240.

Figure 5:
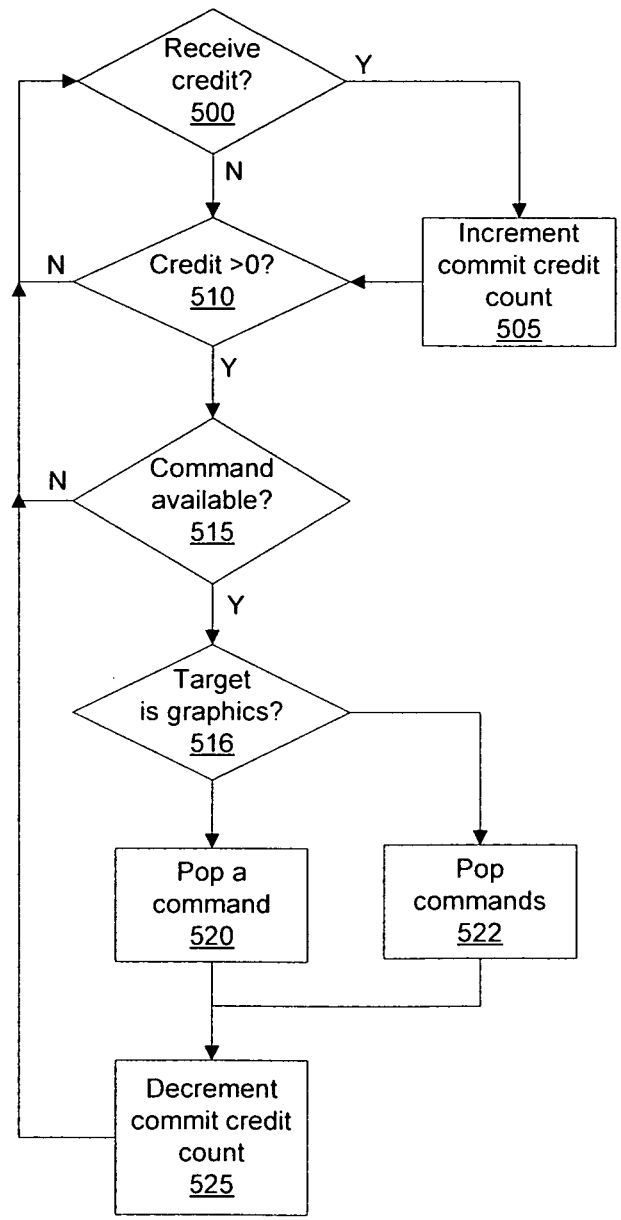
FIG. 5 illustrates an exemplary embodiment of a method for outputting commands to a target processing engine in accordance with one or more aspects of the present invention.

FIG. 5 illustrates an exemplary embodiment of a method for outputting commands to a target processing engine in accordance with one or more aspects of the present invention. In some embodiments of the present invention, valid/credit protocol may be used to output commands from engine interface 260 to a target processing engine. A valid/credit protocol is particularly well-suited for use in a system where the commands have to travel a relatively long distance to reach the target processing engine. The target engine sends engine interface 260 "commit credits" and engine interface 260 outputs one command for each commit credit that is received. In other embodiments of the present invention, a valid/busy protocol may be used. In a clock clock cycle when valid is asserted by engine interface 260 and busy is negated by the target processing engine, a command output by engine interface 260 is accepted by the target processing engine.

In step 500 engine interface 260 determines if a commit credit has been received from the target processing engine, and, if so, in step 505 a commit credit count is incremented. In step 510 engine interface 260 determines if the commit credit count is greater than zero, indicating that a command may be output to the target processing engine. If, in step 510 engine interface 260 determines that the commit credit count is greater than zero, then in step 515 engine interface 260 determines if an in-flight command is available for output to the target processing engine. Otherwise, engine interface 260 returns to step 500.

If, in step 515 engine interface 260 determines that an in-flight command is available for output to the target processing engine, then in step 516 engine interface 260 determines if the target processing engine is graphics engine 150. If, in step 516, engine interface 260 determines that the target processing engine is graphics engine 150, then in step 522 engine interface pops one or more in-flight commands and outputs the one or more in-flight commands to graphics engine 150. Otherwise, in step 520 engine interface 260 pops an in-flight command and outputs the in-flight command to the target processing engine. In other embodiments of the present invention, processing engines other than graphics engine 150 may process two or more commands in parallel, and the two or more commands are output to those processing engines via engine interface 260.

In some embodiments of the present invention, engine interface 260 may output more than one in-flight command, where each of the in-flight commands corresponds to a single commit credit. In step 525 engine interface 260 decrements the commit credit count by the number of in-flight commands that were output in step 520. Persons skilled in the art will appreciate that any system configured to perform the method steps of FIG. 3, 4A, 4B, 4C, 4D, or 5, or their equivalents, is within the scope of the present invention.

Dispatched commands that are in-flight may be rescinded to remove the in-flight commands from a shared command queue and quickly switch from dispatching one instruction stream to dispatching another instruction stream. The ability to switch between different instruction streams during command dispatching enables several of the multiple processing engines to execute commands concurrently. Rescinding in-flight commands may allow the multiple processing engines to achieve greater processing concurrency and improve overall instruction stream throughput.

While the foregoing is directed to embodiments of the present invention, other and further embodiments of the invention may be devised without departing from the basic scope thereof, and the scope thereof is determined by the claims that follow. Specifically, persons skilled in the art will recognize that the methods and systems described may be used for processing data other than graphics data. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A system for dispatching commands for execution by a processing engine, comprising:
   one or more target processing engines;
   a command FIFO memory configured to store one or more commands, wherein each of the one or more commands is associated with a channel and a target processing engine;
   an engine interface coupled to the one or more target processing engines; and
   a dispatcher coupled to the command FIFO memory and the engine interface and configured to:
      receive a first in-flight command associated with a first channel from the command FIFO memory that is a copy of a first command associated with the first channel stored in the command FIFO memory when the first channel is selected for processing,
      push the first in-flight command to the engine interface for storage until the first in-flight command is transmitted to the target processing engine associated with the first command or is rescinded, and
      rescind the first in-flight command when a second channel is selected for processing,
   wherein the command FIFO memory maintains a first command pointer that indicates a location of the first command within the command FIFO memory and a second command pointer that indicates a location of a next command associated with the first channel within the command FIFO memory that is to be transmitted to the target processing engine associated with the next command for execution, and
   wherein the second command pointer is updated to indicate the location of the first command as indicated by the first command pointer when the first in-flight command is rescinded.

2. The system of claim 1, further comprising a parsing unit to produce the first command based on one or more instructions included in the first channel.

3. The system of claim 1, wherein the engine interface outputs the first in-flight command to the target processing engine.

4. The system of claim 1, wherein the dispatcher includes a credit count to compute how many in-flight commands are included in the engine interface.

5. The system of claim 1, wherein the dispatcher drains in-flight commands stored in the engine interface by not outputting any commands from the command FIFO while waiting for the in-flight commands to be output from the engine interface to the target processing engine.

6. The system of claim 1, wherein the one or more commands include a local command to cause the dispatcher to rescind the first in-flight commands when an error condition is indicated by the target processing engine and to generate an interrupt.

7. The system of claim 1, wherein the engine interface maintains a commit credit count indicating a number of in-flight commands that the target processing engine can receive.

8. A method of dispatching one or more commands for execution by a target processing engine, comprising:
   receiving a first in-flight command associated with a first channel from a command FIFO memory that is a copy of a first command associated with the first channel stored in the command FIFO memory, wherein the command FIFO memory stores one or more commands, each of the one or more associated with a channel and a target processing engine of one or more target processing engines;
   pushing the first in-flight command to an engine interface for storage until the first in-flight command is transmitted to a target processing engine associated with the first command or is rescinded; and
   rescinding the first in-flight command when a second channel is selected for processing,
   wherein the command FIFO memory maintains a first command pointer that indicates a location of the first command within the command FIFO memory and a second command pointer that indicates a location of a next command associated with the first channel within the command FIFO memory that is to be transmitted to the target processing engine associated with the next command for execution, and
   wherein the second command pointer is updated to point to the location of the first command as indicated by the first command pointer when the first in-flight command is rescinded.

9. The method of claim 8, further comprising:
   receiving a local command for execution;
   draining any in-flight commands stored in the engine interface; and
   executing the local command.

10. The method of claim 9, wherein the execution of the local command indicates that an error condition exists.

11. The method of claim 8, further comprising:
   discarding the in-flight command stored in the engine interface; and
   copying the first command stored in the command FIFO memory to a second memory resource, wherein the first command is included in a first channel of program instructions.

12. The method of claim 11, further comprising copying the in-flight command stored in the second memory resource to the command FIFO memory to resume the dispatching of the one or more commands.

* * * * *